United States Patent
Pan et al.

(10) Patent No.: US 9,387,458 B2
(45) Date of Patent: Jul. 12, 2016

(54) METHOD FOR REGULATING THE STRUCTURE AND PROPERTIES OF THE COMPOSITE NANOABSORBENT

(75) Inventors: Bingcai Pan, Jiangsu (CN); Jing Wang, Jiangsu (CN); Shujuan Zhang, Jiangsu (CN); Lu Lv, Jiangsu (CN); Weiming Zhang, Jiangsu (CN)

(73) Assignees: NANJING UNIVERSITY (CN); JIANGSU YONGTAI ENVIRONMENTAL SCIENCE AND TECHNOLOGY CO. LTD. (CN)

( * ) Notice: Subject to any disclaimer, the term of this patent is extended or adjusted under 35 U.S.C. 154(b) by 116 days.

(21) Appl. No.: 13/818,834

(22) PCT Filed: Nov. 4, 2011

(86) PCT No.: PCT/CN2011/081818
§ 371 (c)(1),
(2), (4) Date: Feb. 25, 2013

(87) PCT Pub. No.: WO2013/010356
PCT Pub. Date: Jan. 24, 2013

(65) Prior Publication Data
US 2014/0120253 A1    May 1, 2014

(30) Foreign Application Priority Data
Jul. 21, 2011  (CN) .......................... 2011 1 0203812

(51) Int. Cl.
| B01J 20/32 | (2006.01) |
| C02F 1/28 | (2006.01) |
| B01J 20/06 | (2006.01) |
| B01J 20/26 | (2006.01) |
| C02F 101/10 | (2006.01) |
| C02F 101/20 | (2006.01) |

(52) U.S. Cl.
CPC .............. B01J 20/3295 (2013.01); B01J 20/06 (2013.01); B01J 20/267 (2013.01); B01J 20/321 (2013.01); B01J 20/3236 (2013.01); C02F 1/288 (2013.01); C02F 2101/103 (2013.01); C02F 2101/20 (2013.01); C02F 2305/08 (2013.01)

(58) Field of Classification Search
None
See application file for complete search history.

(56) References Cited

U.S. PATENT DOCUMENTS

| 4,675,309 | A | * | 6/1987 | Hirai et al. | 502/402 |
| 4,857,599 | A | * | 8/1989 | Tomalia et al. | 525/259 |
| 5,079,274 | A | * | 1/1992 | Schneider et al. | 521/146 |
| 5,773,384 | A | * | 6/1998 | Davankov et al. | 502/402 |
| 6,127,311 | A | * | 10/2000 | Davankov et al. | 502/402 |
| 2002/0177522 | A1 | * | 11/2002 | Alexander et al. | 502/159 |
| 2010/0130626 | A1 | * | 5/2010 | Fukui et al. | 521/29 |

FOREIGN PATENT DOCUMENTS

| CN | 1772370 A | 5/2006 |
| CN | 1858088 A | 11/2006 |
| CN | 1865302 A | 11/2006 |
| CN | 1935356 A | 3/2007 |
| CN | 101444721 A | 6/2009 |
| CN | 101804333 A | 8/2010 |
| WO | 9837108 A1 | 8/1998 |

OTHER PUBLICATIONS

Zhang et al, Colloids and Surfaces A: Physicochem. Eng. Aspects, 346, pp. 34-38, available online May 29, 2009.*
Shultz et al, Journal of Applied Physics, 105, 07B318 1 to 3, 2009.*
International Search Report; PCT/CN2011/081818; Int'l File Date: Nov. 4, 2011; Nanjing University et al.; 3 pgs.
Gasparovicova, D., Kralik, M., Hronec, M., et al.,"Reduction of nitrates dissolved in water over palladium—copper catalysts supported on a strong cationic resin." Journal of Molecular Catalysis A: Chemical, 2006, vol. 244, 1 pg.
Gasparovicova, D. et al.; "Supported Pd—Cu catalysts in the water phase reduction of nitrates: Functional resin versus alumina", Journal of Molecular Catalysis A: Chemical, 2007, vol. 264, 1 pg.
Gu, Cheng et al.: Synthesis of Highly Reactive Subnano-Sized Zero-Valent Iron Using Smectite Clay Templates; Environmental Science and Technology, 2010, publication date: May 6, 2010, 1 pg.

* cited by examiner

Primary Examiner — Erma Cameron
(74) Attorney, Agent, or Firm — Schmeiser, Olsen & Watts, LLP

(57) ABSTRACT

A method for regulating the structure and properties of the composite nanoabsorbent is provided. This method uses nanoporous chloromethylated polystyrene-divinylbenzene beads as the support material and adopts in situ precipitation method to load dissociative functional nanoparticles thereon; the composite nanoabsorbent of different absorption capacity and absorption speed can be prepared through regulating the pore structure, which is realized herein by means of starting crosslinking reactions through heating chloromethylated beads under existence of the swelling agent and the catalyst; through changing the proportions of different components in the reaction system, modes of heating and time of reaction, the polymer support with different pore structures can be prepared. This invention can successfully regulate the distribution and size of inorganic nanoparticles; the composite nanomaterials prepared by the resin of different degrees of crosslinking present different structures and properties, and the specific structure and properties can be selected in order to meet practical requirements.

18 Claims, No Drawings

METHOD FOR REGULATING THE STRUCTURE AND PROPERTIES OF THE COMPOSITE NANOABSORBENT

CROSS REFERENCE TO RELATED APPLICATIONS

This application is a National Stage Entry of PCT/CN2011/081818 filed on Nov. 4, 2011, which claims the benefit and priority of Chinese Patent Application No. 201102038122, filed on Jul. 21, 2011, the content of which are each incorporated herein by reference.

FIELD OF TECHNOLOGY

This invention relates to a method for regulating the structure and properties of the composite nanoabsorbent, more specifically to a method for regulating the composite absorbent prepared by loading inorganic nanoparticles on the nanoporous polystyrene beads; with the method disclosed herein, the inner structure of the polystyrene beads can be controlled by means of changing its degree of crosslinking, which then indirectly results in the controllable size and distribution of the inorganic nanoparticles within the support; therefore, the regulatable properties of the composite nanoabsorbent are realized.

BACKGROUND

Currently, the heavy metal pollution of water bodies has become a severe worldwide challenge that attracts increasing concerns and researches throughout the world. In recent decades, the inorganic nanoabsorbents prepared with hydrated iron oxide (HFO) and hydrated manganese oxide (HMO) have been unanimously regarded as two of the best heavy metal absorbents. HFO presents unique amphoteric absorbability, namely, it can absorb not only the positively charged cations but also the negatively charged anions; its capability in absorbing arsenic, stibium is extraordinarily remarkable; a large amount of literature published both in China and in other countries has proven this fact. The researches on HMO date back to 1973. The comparatively large specific surface area, high activity and large absorption capacity of HMO particles enable it to present desirable absorbability for such heavy metals as lead, cadmium and zinc. However, despite the desirable properties of HFO and HMO mentioned above, there are many obstacles in putting them into practical application. Firstly, both HFO and HMO particles are extremely fine in size. When directly used in such a fluidization system as the absorption column, large pressure drop will occur; when used in a static absorption system, it would be difficult to guarantee an effective separation, and due to the existence of intraparticle diffusion, the absorption kinetics would not be satisfactory either. Secondly, due to the high activity and the thermodynamic instability of nanoparticles, severe agglomeration may occur in practical application, which will consequently lower down their absorption performance.

In recent decades, adopting polymer materials as the support and loading inorganic metallic functional materials thereon to prepare the composite absorbent has become a common practice, which effectively solves the above-mentioned problems. The materials often used as the support are resin, activated carbon, diatomite, zeolite, fibers and bentonite; all of them are good support materials, however, there still exist many problems requiring improvements.

Pan Bingcai and his team at (China) Nanjing University in two patents (Patent Number: ZL2005 1 00951775; ZL2006 1 004136654) disclosed a series of organic-inorganic composite nanoabsorbents by using nanoporous polymers as the support and then loading nanaparticles of iron oxide and manganese oxide into the nanoporous canals of the polymer support through surface deposition; the composite nanoabsorbents so obtained successfully solved the problem of the deep purification of water containing such pollutants as trace heavy metals, arsenic and selenium, because they not only overcame difficulties resulting from large pressure drop and separation problem when the oxide nanoparticles are directly applied in a fluidization system, but also greatly enhanced absorption selectivity for the target pollutants and absorption capacity as a whole due to the enhanced mass transfer effect engendered by the Donnan membrane formed by fixed charged groups on the surface of the polymer support.

Conventionally, the nanoporous canals of the support polymer are comparatively large (from tens to hundreds of nanometers); with so large the pore canals, the nanosize effect of the support is not very obvious; the size of loaded inorganic nanoparticles is slightly smaller than that of pore canals, but it is still as large as tens of nanometers or even more than one hundred nanometers. Such a structure leads to a series of defects, for example, poor nanosize effect, weak absorption activity, low absorption capacity, undesirable kinetic performance and low absorption selectivity for the target pollutant, for related researches have shown that the smaller inorganic functional particles, the stronger the nanosize effect and reaction activity, the higher absorption capacity, the more desirable kinetic performance and the higher absorption selectivity for the target pollutant.

SUMMARY

1. The Technical Problems to be Solved

A purpose of this invention is to provide a method for regulating the structure and properties of the composite nanoabsorbent whereby the composite nanoabsorbent can be controllably prepared in order to meet practical requirements emerged in deep purification of surface water, groundwater, industrial wastewater, domestic sewage and other waters containing such heavy metals as arsenic, stibium, lead and/or cadmium.

2. Technical Solutions

The principle of this invention lies in firstly adopting the post-crosslinking method to realize controllable preparation of the resin with different degrees of crosslinking (the degree of crosslinking is 8-60%, average pore size is 10-1 nm and the specific surface area is 50-1200 $m^2/g$); then using the resin with different degrees of crosslinking as the support and loading the HFO/HMO nanoparticles thereon through in situ precipitation; the different pore structures resulting from different degrees of crosslinking can be utilized to regulate the size of inorganic nanoparticles, and the preparation of the composite nanoabsorbent with different structures and properties is therefore realized (the loading rate of inorganic nanoparticles, when calculated in iron or manganese, is 3%-15% by mass; more than 95% of nanoparticles are 0.5-8 nm in diameter).

The technical solutions provided in this invention include: a method for regulating the structure and properties of the composite nanoabsorbent, consisting of the following steps:
1) using nanoporous chloromethylated polystyrene-divinylbenzene beads as the support material;
2) mixing the chloromethylated beads, nitrobenzene and zinc chloride ($ZnCl_2$) together in a certain proportion, agitating the mixture and simultaneously heating the mixture slowly in an oil bath till the temperature reaches a certain degree; keeping the temperature constant for a certain period of reaction;

3) naturally cooling off the system after the reaction is complete; taking out the material so obtained and washing it with a large amount of ethanol and water till it turns neutral, then extracting the material with ethanol;

4) drying the extracted material at 60° C., and the resin A with different degrees of crosslinking is obtained;

5) choosing an appropriate type of inorganic functional material B;

6) using the resin absorbent A as the support, loading the inorganic functional material B thereon by means of in situ precipitation; the composite nanoabsorbent is therefore obtained.

In the post-crosslinking reaction process mentioned in step (2), the mass-volume ratio between chloromethylated beads and nitrobenzene is 1:5-1:10; the mass ratio between chloromethylated beads and $ZnCl_2$ is 2:1-10:1; the reaction temperature is 90-200° C. and the reaction time is 1-8 hours; the proportions between chloromethylated beads, nitrobenzene and $ZnCl_2$ as well as the temperature and the time of reaction can be regulated for producing different degrees of crosslinking. The choice of inorganic metallic functional material mentioned in step (5) is determined in relation to the target pollutant; they can be either nanosized hydrated iron oxide or nanosized hydrated manganese oxide.

When other reaction conditions remain unchanged, the degree of crosslinking will decrease in accordance with the increase of mass-volume ratio between chloromethylated beads and nitrobenzene. For example, keeping the mass ratio between chloromethylated beads and $ZnCl_2$ at 3:1, the reaction temperature at 150° C., the reaction time at 8 hours, the degree of crosslinking would be 60%, 45% and 30% respectively when the mass-volume ratios between chloromethylated beads and nitrobenzene are 1:10, 1:7 and 1:5. When other reaction conditions remain unchanged, the degree of crosslinking will decrease in accordance with the increase of mass ratio between chloromethylated beads and $ZnCl_2$. For example, keeping the mass-volume ratio between chloromethylated beads and nitrobenzene at 1:10, the reaction temperature at 150° C., the reaction time at 8 hours, the degree of crosslinking would be 60%, 50% and 40% respectively when the mass ratios between chloromethylated beads and $ZnCl_2$ are 2:1, 4:1 and 10:1. When other reaction conditions remain unchanged, the degree of crosslinking will increase in accordance with the increase of reaction temperature. For example, keeping the mass-volume ratio between chloromethylated beads and nitrobenzene at 1:10, the mass ratio between chloromethylated beads and $ZnCl_2$ at 3:1, the reaction time at 8 hours, the degree of crosslinking would be 60%, 40% and 30% respectively when the reaction temperatures are 150° C., 120° C. and 90° C. When other reaction conditions remain unchanged, the degree of crosslinking will increase in accordance with the extension of reaction time. For example, keeping the mass-volume ratio between chloromethylated beads and nitrobenzene at 1:10, the mass ratio between chloromethylated beads and $ZnCl_2$ at 3:1, the reaction temperature at 150° C., the degree of crosslinking would be 60%, 50% and 20% respectively when the reaction time is 8 hours, 5 hours and 1 hour.

The degree of crosslinking of the controllable polymer support is 8%-60%; the average pore size is 1-10nm, and the volume of this part of nanopores comprises more than 90% of the total pore volume of organic matrix. The in situ precipitation method mentioned in step (6) is specifically conducted in the following way: when the inorganic functional material B is nanosized hydrated iron oxide, mixing (with agitation) the resin A and 0.5-2 mol/L iron chloride ($FeCl_3$) solution together for 24 hours, filtering the mixture and then mixing (with agitation) the material so obtained with 0.5-2 mol/L sodium hydroxide (NaOH) solution for 24 hours, filtering the mixture and washing the material with a large amount of water till it turns neutral, then drying the material at 60° C. and the HFO-loaded composite nanoabsorbent is obtained; when the inorganic functional material B is nanosized hydrated manganese oxide, mixing (with agitation) the resin A and 0.5-2mol/L manganese sulfate ($MnSO_4$) solution together for 24 hours, filtering the mixture and then mixing (with agitation) the material so obtained with 0.5-2mol/L sodium hypochlorite (NaClO) solution for 24 hours, filtering the mixture and washing the material with a large amount of water till it turns neutral, then drying the material at 60° C. and the HMO-loaded composite nanoabsorbent is obtained.

3. Beneficial Effects

This invention provides a method for regulating the structure and properties of the composite nanoabsorbent. In comparison with the prior art, the preparation method provided herein have following advantages:

(1) The method provided herein can prepare the support resin with different nanoporous structures by means of controllable post-crosslinking method; the average pore size of the material so obtained is 1-10 nm, and its specific surface area is 50-1200 $m^2/g$;

(2) the distribution and size of the inorganic nanoparticles can be indirectly regulated by means of changing the pore structure of the resin support;

(3) the composite nanomaterials prepared with the resin of different degrees of crosslinking present different structures and properties, and specific structure and properties can be selected in order to meet the practical requirements.

DETAILED DESCRIPTION

Embodiment 1

There exists a certain amount of simulated wastewater containing 5 ppm arsenic (III); the pH value is 6 and the concentrations of other background ions such as $Cl^-$, $SO_4^{2-}$, $HCO_3^-$ and $SiO_3^-$ are all 0 ppm. In respect of high concentration of arsenic and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (1.2 nm in average);

packing the said nanoabsorbent into a jacketed glass absorption column (φ32×360 mm) and channeling the said simulated water polluted with arsenic (III) through the resin bed at the flow rate of 500 ml/L; the total treatment capacity is 10,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

BV refers to the volume of the resin bed.

Embodiment 2

There exists a certain amount of simulated wastewater containing 1 ppm arsenic (III); the pH value is 6 and the concentrations of other background ions such as $Cl^-$, $SO_4^{2-}$, $HCO_3^-$ and $SiO_3^-$ are all 500 ppm. In respect of moderate concentration of arsenic and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (2.5 nm in average); packing the said nanoabsorbent into a jacketed glass absorption column (φ32×360 mm) and channeling the said simulated water polluted with arsenic (III) through the resin bed at the flow rate of 500 ml/L; the total treatment capacity is 25,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

Embodiment 3

There exists a certain amount of simulated wastewater containing 1 ppm arsenic (III); the pH value is 6 and the concentrations of other background ions such as $Cl^-$, $SO_4^{2-}$, $HCO_3^-$ and $SiO_3^-$ are all 50 ppm. In respect of moderate concentration of arsenic and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 50%; the specific surface area is 900 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (2.0 nm in average); packing the said nanoabsorbent into a jacketed glass absorption column (φ32×360 mm) and channeling the said simulated water polluted with arsenic (III) through the resin bed at the flow rate of 500 ml/L; the total treatment capacity is 32,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

Embodiment 4

There exists a certain amount of simulated wastewater containing 1 ppm arsenic (III); the pH value is 6 and the concentrations of other background ions such as $Cl^-$, $SO_4^{2-}$, $HCO_3^-$ and $SiO_3^-$ are all 0 ppm. In respect of moderate concentration of arsenic and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with arsenic (III) through the resin bed at the flow rate of 500 ml/L; the total treatment capacity is 40,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

BV refers to the volume of the resin bed.

Embodiment 5

There exists a certain amount of simulated wastewater containing 0.2 ppm arsenic (III); the pH value is 6 and the concentrations of other background ions such as $Cl^-$, $SO_4^{2-}$, $HCO_3^-$ and $SiO_3^-$ are all 500 ppm. In respect of low concentration of arsenic and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 m$^2$/g; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (2.5 nm in average); packing the said nanoabsorbent into a jacketed glass absorption column ($\phi$32×360 mm) and channeling the said simulated water polluted with arsenic (III) through the resin bed at the flow rate of 500 ml/L; the total treatment capacity is 45,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

Embodiment 6

There exists a certain amount of simulated wastewater containing 1 ppm arsenic (III); the pH value is 6 and the concentrations of other background ions such as $Cl^-$, $SO_4^{2-}$, $HCO_3^-$ and $SiO_3^-$ are all 50 ppm. In respect of moderate concentration of arsenic and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 200 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 46%; the specific surface area is 800 m$^2$/g; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (1.8 nm in average); packing the said nanoabsorbent into a jacketed glass absorption column ($\phi$32×360 mm) and channeling the said simulated water polluted with arsenic (III) through the resin bed at the flow rate of 500 ml/L; the total treatment capacity is 34,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

BV refers to the volume of the resin bed.

Embodiment 7

There exists a certain amount of simulated wastewater containing 1 ppm arsenic (III); the pH value is 6 and the concentrations of other background ions such as $Cl^-$, $SO_4^{2-}$, $HCO_3^-$ and $SiO_3^-$ are all 50 ppm. In respect of moderate concentration of arsenic and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 200 ml nitrobenzene and 5 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 50%; the specific surface area is 900 m$^2$/g; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (2.0 nm in average); packing the said nanoabsorbent into a jacketed glass absorption column ($\phi$32×360 mm) and channeling the said simulated water polluted with arsenic (III) through the resin bed at the flow rate of 500 ml/L; the total treatment capacity is 32,000 BV and the concentration of arsenic in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of arsenic is higher than 99%; the desorbed resin can be reused as the support.

BV refers to the volume of the resin bed.

Embodiment 8

There exists a certain amount of simulated wastewater containing 5 ppm stibium (III); the pH value is 6 and the concentrations of other background ions such as $Cl^-$, $SO_4^{2-}$, $HCO_3^-$ and $SiO_3^-$ are all 0 ppm. In respect of high concentration of stibium and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 8,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

BV refers to the volume of the resin bed.

Embodiment 9

There exists a certain amount of simulated wastewater containing 1 ppm stibium (III); the pH value is 6 and the concentrations of other background ions such as $Cl^-$, $SO_4^{2-}$, $HCO_3^-$ and $SiO_3^-$ are all 500 ppm. In respect of moderate concentration of stibium and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more 99% of HFO particles are 0.5-8 nm in diameter (2.5 nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 20,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

Embodiment 10

There exists a certain amount of simulated wastewater containing 1 ppm stibium (III); the pH value is 6 and the concentrations of other background ions such as $C^-$, $SO_4^{2-}$, $HCO_3^-$ and $SiO_3^-$ are all 50 ppm. In respect of moderate concentration of stibium and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 50%; the specific surface area is 900 $m^2/g$; the volume of 1-10 nm pores comprises 95% of the total pore volume of the organic matrix); slowly channeling 2.5 L 2.5M $FeCl_3$ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more 99% of HFO particles are 0.5-8 nm in diameter (2.0 nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 28,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

Embodiment 11

There exists a certain amount of simulated wastewater containing 1 ppm stibium (III); the pH value is 6 and the concentrations of other background ions such as $C^-$, $SO_4^{2-}$, $HCO_3^-$ and $SiO_3^-$ are all 0 ppm. In respect of moderate concentration of stibium and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 m²/g; the volume of 1-10 nm pores comprises 95% of the total pore volume of the organic matrix); slowly channeling 2.5 L 2.5M FeCl₃ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 35,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

BV refers to the volume of the resin bed.

Embodiment 12

There exists a certain amount of simulated wastewater containing 0.2 ppm stibium (III); the pH value is 6 and the concentrations of other background ions such as C⁻, $SO_4^{2-}$, $HCO_3^-$ and $SiO_3^-$ are all 500 ppm. In respect of low concentration of stibium and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g ZnCl₂ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 m²/g; the volume of 1-10 nm pores comprises 95% of the total pore volume of the organic matrix); slowly channeling 2.5 L 2.5M FeCl₃ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (2.5nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 40,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

Embodiment 13

There exists a certain amount of simulated wastewater containing 1 ppm stibium (III); the pH value is 6 and the concentrations of other background ions such as C⁻, $SO_4^{2-}$, $HCO_3^-$ and $SiO_3^-$ are all 50 ppm. In respect of moderate concentration of stibium and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 200 ml nitrobenzene and 10 g ZnCl₂ together, agitating the mixture and simultaneously heating the mixture at the rate of 2° C./min till the temperature reaches 120° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 46%; the specific surface area is 800 m²/g; the volume of 1-10 nm pores comprises 95% of the total pore volume of the organic matrix); slowly channeling 2.5 L 2.5M FeCl₃ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (1.8 nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 30,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

Embodiment 14

There exists a certain amount of simulated wastewater containing 1 ppm stibium (III); the pH value is 6 and the concentrations of other background ions such as C⁻, $SO_4^{2-}$, $HCO_3^-$ and $SiO_3^-$ are all 50 ppm. In respect of moderate concentration of stibium and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 200 ml nitrobenzene and 5 g ZnCl₂ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 50%; the specific surface area is 900 m²/g; the volume of 1-10 nm pores comprises 95% of the total pore volume of the organic matrix); slowly channeling 2.5 L 2.5M FeCl₃ and 150 ml mixed solution containing 20 g NaOH in succession through 50 ml (about 30 g) of the said resin and then dehydrating the material with centrifuging; after the heat treatment, the composite nanoabsorbent loaded with HFO (loading rate is 10% by iron) is therefore obtained, wherein more than 99% of HFO particles are 0.5-8 nm in diameter (2.0 nm in average); packing the said nanoabsorbent into a jacketed glass absorption column (φ32×360 mm) and channeling the said simulated water polluted with stibium (III) through the resin bed at the flow rate of 500 ml/L; the total treatment capacity is 20,000 BV and the concentration of stibium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of stibium is higher than 99%; the desorbed resin can be reused as the support.

Embodiment 15

There exists a certain amount of simulated wastewater containing 10 ppm lead; the pH value is 6 and the concentrations of other background ions such as $Ca^{2+}$, $Mg^{2+}$ and $Na^+$ are all 0 ppm. In respect of high concentration of lead and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 $m^2/g$; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with lead through the resin bed at the flow rate of 500 ml/L; the total treatment capacity is 15,000 BV and the concentration of lead in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of lead is higher than 99%; the desorbed resin can be reused as the support.

BV refers to the volume of the resin bed.

Embodiment 16

There exists a certain amount of simulated wastewater containing 2 ppm lead; the pH value is 6 and the concentrations of other background ions such as $Ca^{2+}$, $Mg^{2+}$ and $Na^+$ are all 500 ppm. In respect of moderate concentration of lead and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 $m^2/g$; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (2.5 nm in average); packing the said nanoabsorbent into a jacketed glass absorption column (φ32×360 mm) and channeling the said simulated water polluted with lead through the resin bed at the flow rate of 500 ml/L; the total treatment capacity is 32,000 BV and the concentration of lead in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of lead is higher than 99%; the desorbed resin can be reused as the support.

Embodiment 17

There exists a certain amount of simulated wastewater containing 2 ppm lead; the pH value is 6 and the concentrations of other background ions such as $Ca^{2+}$, $Mg^{2+}$ and $Na^+$ are all 50 ppm. In respect of moderate concentration of lead and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 50%; the specific surface area is 900 $m^2/g$; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (2.0 nm in average); packing the said nanoabsorbent into a jacketed glass absorption column (φ32×360 mm) and channeling the said simulated water polluted with lead through the resin bed at the flow rate of 500 ml/L; the total treatment capacity is 44,000 BV and the concentration of lead in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of lead is higher than 99%; the desorbed resin can be reused as the support.

Embodiment 18

There exists a certain amount of simulated wastewater containing 2 ppm lead; the pH value is 6 and the concentrations of other background ions such as $Ca^{2+}$, $Mg^{2+}$ and $Na^+$ are all 0 ppm. In respect of moderate concentration of lead and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 5 hours of reaction, and naturally cooling off the system after the reaction is complete; taking out the material so obtained and extracting it with absolute ethanol for 8 hours; drying the material at 60° C. for 5 hours, and the resin with high degree of crosslinking is therefore obtained (the degree of crosslinking is 60%; the specific surface area is 1200 $m^2/g$; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with lead through the resin bed at the flow rate of 500 ml/L; the total treatment capacity is 50,000 BV and the concentration of lead in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of lead is higher than 99%; the desorbed resin can be reused as the support.

BV refers to the volume of the resin bed.

Embodiment 19

There exists a certain amount of simulated wastewater containing 0.4 ppm lead; the pH value is 6 and the concentrations of other background ions such as $Ca^{2+}$, $Mg^{2+}$ and $Na^+$ are all 500 ppm. In respect of low concentration of lead and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 $m^2/g$; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (2.5nm in average); packing the said nanoabsorbent into a jacketed glass absorption column (φ32×360 mm) and channeling the said simulated water polluted with lead through the resin bed at the flow rate of 500 ml/L; the total treatment capacity is 60,000 BV and the concentration of lead in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of lead is higher than 99%; the desorbed resin can be reused as the support.

Embodiment 20

There exists a certain amount of simulated wastewater containing 10 ppm cadmium; the pH value is 6 and the concentrations of other background ions such as $Ca^{2+}$, $Mg^{2+}$ and $Na^+$ are all 0 ppm. In respect of high concentration of cadmium and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 $m^2/g$; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with cadmium through the resin bed at the flow rate of 500 ml/L; the total treatment capacity is 12,000 BV and the concentration of cadmium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of cadmium is higher than 99%; the desorbed resin can be reused as the support.

BV refers to the volume of the resin bed.

Embodiment 21

There exists a certain amount of simulated wastewater containing 2 ppm cadmium; the pH value is 6 and the concentrations of other background ions such as $Ca^{2+}$, $Mg^{2+}$ and $Na^+$ are all 500 ppm. In respect of moderate concentration of cadmium and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 m²/g; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (2.5 nm in average); packing the said nanoabsorbent into a jacketed glass absorption column (φ32×360 mm) and channeling the said simulated water polluted with cadmium through the resin bed at the flow rate of 500 ml/L; the total treatment capacity is 30,000 BV and the concentration of cadmium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of cadmium is higher than 99%; the desorbed resin can be reused as the support.

Embodiment 22

There exists a certain amount of simulated wastewater containing 2 ppm cadmium; the pH value is 6 and the concentrations of other background ions such as $Ca^{2+}$, $Mg^{2+}$ and $Na^+$ are all 50 ppm. In respect of moderate concentration of cadmium and fairly low concentration of background ions in the wastewater, a kinetically fairly fast composite nanoabsorbent with fairly high anticompetitiveness and very high absorption capacity should be prepared for treating it; therefore, a resin with 50% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 50%; the specific surface area is 900 m²/g; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (2.0 nm in average); packing the said nanoabsorbent into a jacketed glass absorption column (φ32×360 mm) and channeling the said simulated water polluted with cadmium through the resin bed at the flow rate of 500 ml/L; the total treatment capacity is 38,000 BV and the concentration of cadmium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of cadmium is higher than 99%; the desorbed resin can be reused as the support.

Embodiment 23

There exists a certain amount of simulated wastewater containing 2 ppm cadmium; the pH value is 6 and the concentrations of other background ions such as $Ca^{2+}$, $Mg^{2+}$ and $Na^+$ are all 0 ppm. In respect of moderate concentration of cadmium and no background ions in the wastewater, a kinetically very fast composite nanoabsorbent with very high absorption capacity should be prepared for treating it; therefore, a resin with 60% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 150° C.; keeping the temperate constant for 8 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 60%; the specific surface area is 1200 m²/g; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (1.2 nm in average); packing the said nanoabsorbent into a jacketed glass absorption column (φ32×360 mm) and channeling the said simulated water polluted with cadmium through the resin bed at the flow rate of 500 ml/L; the total treatment capacity is 45,000 BV and the concentration of cadmium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of cadmium is higher than 99%; the desorbed resin can be reused as the support.

BV refers to the volume of the resin bed.

Embodiment 24

There exists a certain amount of simulated wastewater containing 0.4 ppm cadmium; the pH value is 6 and the concentrations of other background ions such as $Ca^{2+}$, $Mg^{2+}$ and $Na^+$ are all 500 ppm. In respect of low concentration of cadmium and high concentration of background ions in the wastewater, a kinetically fairly fast composite nanoabsorbent with very high selectivity and fairly high absorption capacity should be prepared for treating it; therefore, a resin with 40% degree of crosslinking is adopted herein as the support of the composite absorbent.

Mixing 30 g chloromethylated styrene-distyrene beads, 300 ml nitrobenzene and 10 g $ZnCl_2$ together, agitating the mixture and simultaneously heating the mixture at the rate of 2° C./min till the temperature reaches 120° C.; keeping the temperate constant for 6 hours of reaction, and naturally cooling off the system after the reaction is complete; taking out the material so obtained and extracting it with absolute ethanol for 5 hours; drying the material at 60° C. for 5 hours, and the resin with high degree of crosslinking is therefore obtained (the degree of crosslinking is 40%; the specific surface area is 600 m²/g; the volume of 1-10 nm pores comprises 95% of the total pore volume of the organic matrix); slowly channeling 2.5 L 2.0M $MnSO_4$ and 150 ml mixed solution containing 20 g NaClO in succession through 50 ml (about 30 g) of the said resin and then dehydrating the material with centrifuging; after the heat treatment, the composite nanoabsorbent loaded with HMO (loading rate is 10% by manganese) is therefore obtained, wherein more than 99% of HFO particles are 0.5-8 nm in diameter (2.5nm in average); packing the said nanoabsorbent into a jacketed glass absorption column (φ32×360 mm) and channeling the said simulated water polluted with cadmium through the resin bed at the flow rate of 500 ml/L; the total treatment capacity is 50,000 BV and the concentration of cadmium in the effluent is lower than 5 ppb.

Controlling the temperature at 50±5° C. and co-currently channeling 200 ml mixed solution containing 4% NaOH and 8% NaCl at the flow rate of 100 ml/L through the resin bed for desorption; the desorption rate of cadmium is higher than 99%; the desorbed resin can be reused as the support.

What is claimed is:

1. A method for regulating the structure and properties of a composite nanoabsorbent, consisting of the following steps:
   1) providing nanoporous chloromethylated polystyrene-divinylbenzene beads;
   2) mixing the nanoporous chloromethylated polystyrene-divinylbenzene beads, nitrobenzene and zinc chloride ($ZnCl_2$) together, agitating the mixture and simultaneously heating the mixture at a rate of 2° C./min in an oil bath until a reaction temperature of 90-200° C. is reached, and keeping the reaction temperature constant for a reaction time of 1-8 hours;
   3) naturally cooling off the mixture after heating the mixture and keeping the reaction temperature constant, and taking out the material so obtained and washing the material successively with ethanol and water until an effluent of the washed material turns neutral, then extracting the material with absolute ethanol for 5 hours;
   4) drying the extracted material at 60° C. to obtain a resin (resin A) with various degrees of crosslinking;
   5) choosing inorganic functional nanoparticles B selected from the group consisting of nanosized hydrated ferric oxides and hydrated manganese oxides; and
   using the resin A as a support, loading the inorganic functional nanoparticles B thereon by means of in situ precipitation between corresponding metallic ions of the inorganic functional nanoparticles B and a NaOH solution; the composite nanoabsorbent is therefore obtained.

2. The method for regulating the structure and properties of the composite nanoabsorbent as defined in claim 1, wherein the composite nanoabsorbent of various absorption capacities and absorption speed is prepared through regulation of a pore structure, said regulation of the pore structure of the nanoabsorbent is performed via crosslinking reactions by heating chloromethylated polystyrene-divinylbenzene beads under existence of nitrobenzene and $ZnCl_2$; wherein changing proportions of the chloromethylated polystyrene-divinylbenzene beads, nitrobenzene, $ZnCl_2$, modes of heating and reaction time, results in resin A having a degree of crosslinking of 8-60% and a specific surface area of 50-1200m²/g.

3. The method for regulating the structure and properties of the composite nanoabsorbent as defined in claim 2, wherein the mixture of chloromethylated beads and nitrobenzene has a mass-volume ratio of 1:5-1:10; the mixture of chloromethylated beads and $ZnCl_2$ has a mass ratio of 2:1-1:10; and the degree of crosslinking is regulated by changing the proportions between chloromethylated beads, nitrobenzene and $ZnCl_2$, the reaction temperature and the reaction time.

4. The method for regulating the structure and properties of the composite nanoabsorbent as defined in claim 3, further comprising the step of decreasing the degree of crosslinking by increasing the mass-volume ratio between chloromethylated beads and nitrobenzene, while the mass ratio of the chloromethylated beads and $ZnCl_2$, reaction temperature and reaction time remain unchanged.

5. The method for regulating the structure and properties of the composite nanoabsorbent as defined in claim 3, further comprising the step of decreasing the degree of crosslinking by increasing the mass ratio between chloromethylated beads and $ZnCl_2$, while the mass-volume ratio of the chloromethylated beads and nitrobenzene, reaction temperature and reaction time remain unchanged.

6. The method for regulating the structure and properties of the composite nanoabsorbent as defined in claim 3, further comprising the step of increasing the degree of crosslinking by increasing the reaction temperature, while the mass-volume ratio of the chloromethylated beads and nitrobenzene, mass ratio between chloromethylated beads and $ZnCl_2$, and reaction time remain unchanged.

7. The method for regulating the structure and properties of the composite nanoabsorbent as defined in claim 3, further comprising the step of increasing the degree of crosslinking by increasing the reaction time, while the mass-volume ratio of the chloromethylated beads and nitrobenzene, mass ratio between chloromethylated beads and $ZnCl_2$, and reaction temperature remain unchanged.

8. The method for regulating the structure and properties of the composite nanoabsorbent as defined in claim 3, wherein the degree of crosslinking of resin A is 8% -60% ; the pore structure has an average pore size of 1-10nm and 95% to more than 99% of the inorganic functional nanoparticles B are 0.5-8nm in diameter.

9. The method for regulating the structure and properties of the composite nanoabsorbent as defined in claim 2, wherein the choice of inorganic functional nanoparticles B is determined in relation to a target pollutant selected from the group consisting of arsenic, stibium, lead, zinc and cadmium.

10. A method for regulating the structure and properties of a composite nanoabsorbent, comprising:
   1) providing nanoporous chloromethylated polystyrene-divinylbenzene;
   2) mixing a solution of the chloromethylated polystyrene-divinylbenzene beads, nitrobenzene and zinc chloride ($ZnCl_2$) together, agitating the mixture and simultaneously heating the mixture at a rate of 2° C./min in an oil bath until the reaction temperature reaches 90-200° C., and keeping the reaction temperature constant for a reaction time of 1-8 hours;
   3) naturally cooling off the mixture after heating the mixture and keeping the reaction temperature constant, and taking out the material so obtained and washing the material successively with ethanol and water until an effluent turns neutral, then extracting the material with absolute ethanol for 5 hours;
   4) drying the extracted material at 60° C. to obtain a resin (resin A) with various degrees of crosslinking;
   5) choosing inorganic functional nanoparticles B selected from the group consisting of nanosized hydrated ferric oxides and hydrated manganese oxides; and
   6) using the resin A as a support, loading the inorganic functional nanoparticles B thereon by means of in situ precipitation between corresponding metallic ions of the inorganic functional nanoparticles B and a NaOH solution; the composite nanoabsorbent is therefore obtained.

11. The method for regulating the structure and properties of the composite nanoabsorbent as defined in claim 10, wherein the composite nanoabsorbent of various absorption capacities and absorption speed is prepared through regulation of a pore structure, said regulation of the pore structure of the nanoabsorbent is performed via crosslinking reactions by heating chloromethylated polystyrene-divinylbenzene beads under existence of nitrobenzene and $ZnCl_2$; wherein changing proportions of the chloromethylated polystyrene-divinylbenzene beads, nitrobenzene, $ZnCl_2$, modes of heating and reaction time, results in resin A having a degree of crosslinking of 8-60% and a specific surface area of 20-1200m²/g.

12. The method for regulating the structure and properties of the composite nanoabsorbent as defined in claim 11, wherein the mixture of chloromethylated beads and nitrobenzene has a mass-volume ratio of 1:5-1:10; the mixture of chloromethylated beads and $ZnCl_2$ has a mass ratio of 2:1-1:10; and the degree of crosslinking is regulated by changing the proportions between chloromethylated beads, nitrobenzene and $ZnCl_2$, the reaction temperature and the reaction time.

13. The method for regulating the structure and properties of the composite nanoabsorbent as defined in claim 12, further comprising the step of decreasing the degree of crosslinking by increasing the mass-volume ratio between chloromethylated beads and nitrobenzene, while the mass ratio of the chloromethylated beads and $ZnCl_2$, reaction temperature and reaction time remain unchanged.

14. The method for regulating the structure and properties of the composite nanoabsorbent as defined in claim 12, further comprising the step of decreasing the degree of crosslinking by increasing the mass ratio between chloromethylated beads and $ZnCl_2$, while the mass-volume ratio of the chloromethvlated beads and nitrobenzene, reaction temperature and reaction time remain unchanged.

15. The method for regulating the structure and properties of the composite nanoabsorbent as defined in claim 12, further comprising the step of increasing the degree of crosslinking by increasing the reaction temperature, while the mass-volume ratio of the chloromethvlated beads and nitrobenzene, mass ratio between chloromethvlated beads and $ZnCl_2$, and reaction time remain unchanged.

16. The method for regulating the structure and properties of the composite nanoabsorbent as defined in claim 12, further comprising the step of increasing the degree of crosslinking by increasing the reaction time, while the mass-volume ratio of the chloromethylated beads and nitrobenzene, mass ratio between chloromethylated beads and $ZnCl_2$, and reaction temperature remain unchanged.

17. The method for regulating the structure and properties of the composite nanoabsorbent as defined in claim 12, wherein the degree of crosslinking of resin A is 8% -60% ; the pore structure has an average pore size of 1-10nm and 95% to more than 99% of the inorganic functional nanoparticles B are 0.5-8nm in diameter.

18. The method for regulating the structure and properties of the composite nanoabsorbent as defined in claim 11, wherein the choice of inorganic functional nanoparticles B is determined in relation to a target pollutant selected from the group consisting of arsenic, stibium, lead, zinc and cadmium.

* * * * *